UNITED STATES PATENT OFFICE.

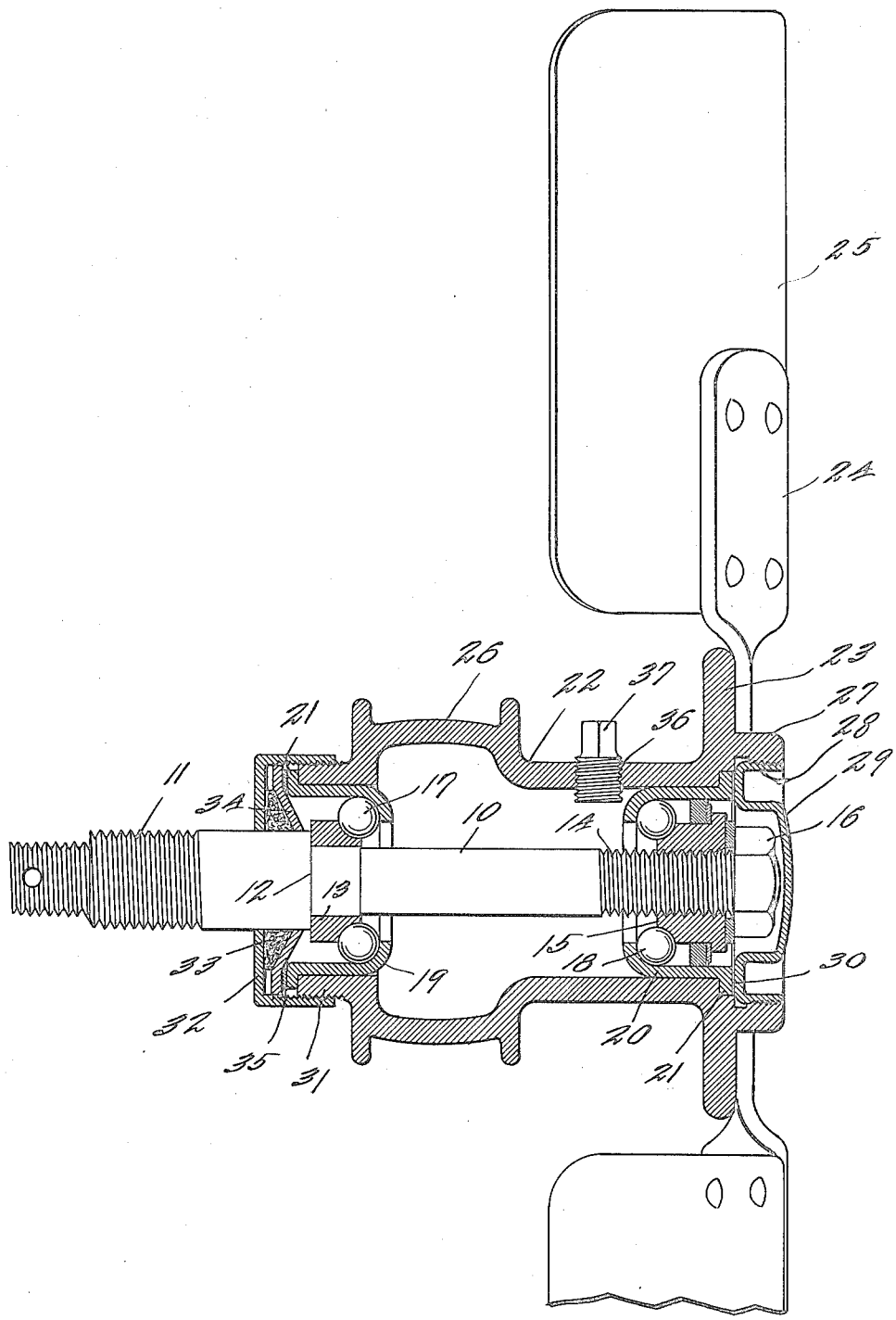

CARL G. SWENSON, OF INDIANAPOLIS, INDIANA, ASSIGNOR TO THE OAKES COMPANY, OF INDIANAPOLIS, INDIANA, A CORPORATION OF INDIANA.

OIL-TIGHT BEARING.

1,231,218.     Specification of Letters Patent.     Patented June 26, 1917.

Application filed December 2, 1916. Serial No. 134,558.

*To all whom it may concern:*

Be it known that I, CARL G. SWENSON a citizen of the United States, residing at Indianapolis, in the county of Marion and State of Indiana, have invented a new and useful Oil-Tight Bearing, of which the following is a specification.

It is the object of my present invention to provide a bearing construction which shall require no attention as to lubrication for long periods, during which it remains in a well lubricated condition. This bearing is particularly intended as a fan bearing, for the average automobile owner and driver pays practically no attention to the lubrication of his ventilating fan, and as a result such fan ordinarily soon begins to run dry, resulting in loss of both power and ventilation and frequently in injury to both the engine and the fan by reason of over-heating.

The accompanying drawing illustrates my invention. The single figure of such drawing is a vertical sectional view through a fan embodying my invention.

As in ordinary practice, the fan is carried by a stud shaft 10, which is provided with a screw thread 11 at one end for attachment to any convenient supporting part. The stud shaft 10 is provided with a shoulder 12 for receiving the pressure of one ball cone 13, and with a screw thread 14 at the end opposite the thread 11 to receive a second ball cone 15, which is threaded so as to be adjustable on the thread 14 and is locked in place by a lock nut 16. The ball cones 13 and 15 form races for the balls 17 and 18 respectively, which also run in identical ball cups 19 and 20 formed of pressed steel and provided with flanges 21 which bear against one end and a shoulder near the other end of a one-piece, rotatable, hollow casing 22, which near one end is provided with an outwardly projecting flange 23 for the attachment of the spider 24 carrying the fan blades 25 and near the other is made in the form of a belt pulley 26 by which the casing may be driven to operate the fan. The end of the casing 22 in which the ball cup 20 is located and which carries the spider 24 has an annular projection 27 on which said spider 24 fits and which is threaded internally to receive a pressed steel plug 28 which has a raised center portion 29 of polygonal shape covering but spaced from the nut 16, a gasket 30 being provided between such plug 28 and the adjacent face of the flange 21 so as to prevent leakage along the thread between the plug 28 and the projection 27. Thus no joint between relatively moving parts is necessary at this end of the casing 22. At the opposite end of the casing, containing the ball cup 19, such casing has an annular projection 31 which is screw-threaded externally to receive an internally threaded, pressed steel cap 32 which is perforated to permit the passage of the stud shaft 10. A packing 33 is provided around the shaft 10 between this cap 32 and a pressed steel annulus 34 surrounding the shaft 10 and fitting loosely within such cup, and a gasket 35 is provided between this annulus 34 and the flange 21 of the ball cup 19 to provide a tight joint so as to prevent leakage along the thread between the projection 31 and cap 32. When the cap 32 is tightened, it compresses the packing 33 and forces it inward against the shaft 10, the annulus 34 preferably being partly conical to assist in this, and also compresses the gasket 35 between such annulus 34 and the flange 21 and forces such flange against the end of the projection 31. Thus the only joint between relatively moving parts is along the shaft 10 under the inner edges of the annulus 34, the packing 33, and cap 32; and the packing 33 effectually prevents material leakage along this joint. The casing 22 is provided with a filling opening 36 at any convenient point, which filling opening is normally closed by a plug 37. When this plug is removed, enough lubricant may be put within the casing 22 to provide lubrication for many months, on account of the small chance for leakage. In consequence, the fan runs practically without attention. The ball cups 19 and 20 fit closely within the hollow casing 22 throughout their length, so that ordinarily no gaskets are necessary between their flanges 21 and such casing.

I claim as my invention:

1. A bearing, comprising a stud shaft, ball cones mounted thereon, one of them having a screw-thread mounting on said stud shaft, a hollow rotatable casing surrounding said shaft and provided with a filling opening, pressed steel ball cups fitting in the ends of said casing and having outwardly projecting flanges bearing against faces on such casing, balls between said ball cones and ball cups, said casing at one end having an annular projection beyond and surrounding said flange, a pressed steel plug screw-threaded in said projection and acting against the ball cup in that end of the casing, said casing at the other end having a screw-threaded projection, a pressed steel cap having a screw-threaded mounting on said last-named projection and perforated to allow the passage of the stud shaft, and a pressed steel annulus within said cup, said annulus being partly conical, a packing between said cap and annulus and bearing against the shaft, said annulus acting against said ball cup in the adjacent end of said casing so that by the tightening of said cap the packing is compressed and the annulus and ball cup forced toward the end of the casing.

2. A bearing, comprising a stud shaft, ball cones mounted thereon, one of them having a screw-thread mounting on said stud shaft, a hollow rotatable casing surrounding said shaft and provided with a filling opening, pressed steel ball cups fitting in the ends of said casing and having outwardly projecting flanges bearing against faces on such casing, balls between said ball cones and ball cups, said casing at one end having an annular projection beyond and surrounding said flange, a pressed steel plug screw-threaded in said projection and acting against the ball cup in that end of the casing, said casing at the other end having a screw-threaded projection, a pressed steel cap having a screw-threaded mounting on said last-named projection and perforated to allow the passage of the stud shaft, and a pressed steel annulus within said cup, a packing located between said cap and annulus and bearing against the shaft, said annulus acting against said ball cup in the adjacent end of said casing so that by the tightening of said cap the packing is compressed and the annulus and ball cup forced toward the end of the casing.

3. A bearing, comprising a stud shaft, ball cones mounted thereon, one of them having a screw-thread mounting on said stud shaft, a hollow rotatable casing surrounding said shaft and provided with a filling opening, ball cups fitting in the ends of said casing and having outwardly projecting flanges bearing against faces on such casing, balls between said ball cones and ball cups, said casing at one end having an annular projection beyond and surrounding said flange, a plug screw-threaded in said projection and acting against the ball cup in that end of the casing, said casing at the other end having a screw-threaded projection, a cap having a screw-threaded mounting on said last-named projection and perforated to allow the passage of the stud shaft, and an annulus within said cup, said annulus being partly conical, a packing located between said cap and annulus and bearing against the shaft, said annulus acting against said ball cup in the adjacent end of said casing so that by the tightening of said cap the packing is compressed and the annulus and ball cup forced toward the end of the casing.

4. A bearing, comprising a stud shaft, ball cones mounted thereon, one of them having a screw-threaded mounting on said stud shaft, a hollow rotatable casing surrounding said shaft and provided with a filling opening, ball cups fitting in the ends of said casing and having outwardly projecting flanges bearing against faces on such casing, balls between said ball cones and ball cups, said casing at one end having an annular projection beyond and surrounding said flange, a plug screw-threaded in said projection and acting against the ball cup in that end of the casing, said casing at the other end having a screw-threaded projection, a cap having a screw-threaded mounting on said last-named projection and perforated to allow the passage of the stud shaft, and an annulus within said cup, a packing located between said cap and annulus and bearing against the shaft, said annulus acting against said ball cup in the adjacent end of said casing so that by the tightening of said cap the packing is compressed and the annulus and ball cup forced toward the end of the casing.

In witness whereof, I have hereunto set my hand at Indianapolis, Indiana, this 28th day of November, A. D. one thousand nine hundred and sixteen.

CARL G. SWENSON.